No. 640,244.  
C. A. WEVER.  
ANIMAL TRAP.  
(Application filed Apr. 27, 1898.)  
Patented Jan. 2, 1900.
(No Model.)
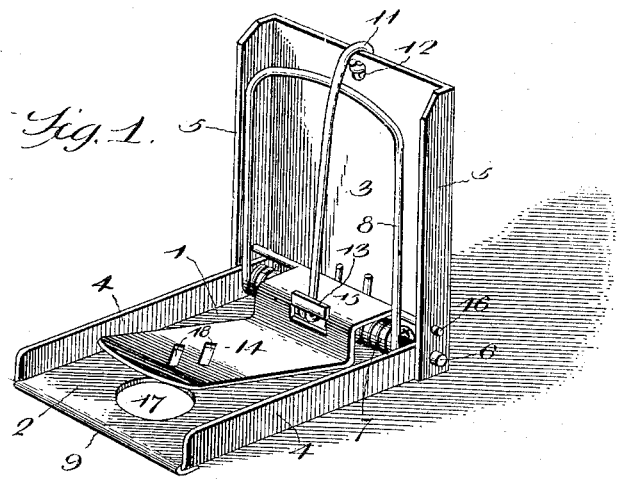
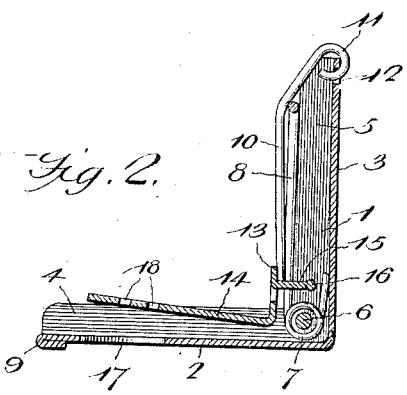
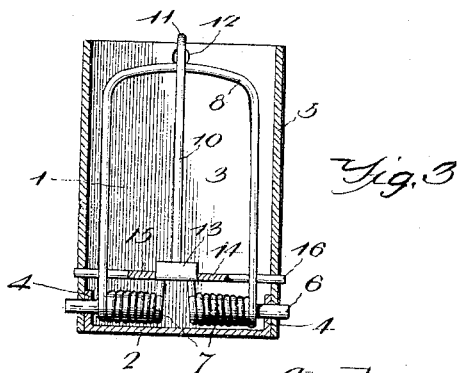
Witnesses  
J. Frank Culverwell,  
J. F. W. Riley
Charles A. Wever, Inventor.  
By C. A. Snow & Co. Attorneys.

UNITED STATES PATENT OFFICE.

CHARLES A. WEVER, OF SIOUX CITY, IOWA.

ANIMAL-TRAP.

SPECIFICATION forming part of Letters Patent No. 640,244, dated January 2, 1900.

Application filed April 27, 1898. Serial No. 678,989. (No model.)

*To all whom it may concern:*

Be it known that I, CHARLES A. WEVER, a citizen of the United States, residing at Sioux City, in the county of Woodbury and State of Iowa, have invented a new and useful Animal-Trap, of which the following is a specification.

The invention relates to improvements in animal-traps.

The object of the present invention is to improve the construction of animal-traps and to provide a simple, inexpensive, and efficient one which will be positive and reliable in operation and adapted to be readily sprung by the slightest pressure on the bait-treadle.

The invention consists in the construction and novel combination and arrangement of parts, as hereinafter fully described, illustrated in the accompanying drawings, and pointed out in the claims hereto appended.

In the drawings, Figure 1 is a perspective view of an animal-trap constructed in accordance with this invention and shown set. Fig. 2 is a vertical longitudinal sectional view of the same. Fig. 3 is a transverse sectional view.

Like numerals of reference designate corresponding parts in all the figures of the drawings.

1 designates a frame constructed of sheet metal and composed of a horizontal base 2 and a substantially vertical back 3, formed integral with the base, the frame being constructed of a single piece of sheet metal and provided at the sides of the back and base with flanges 4 and 5, overlapped at their adjacent ends. The overlapped ends of the side flanges 4 and 5 are provided with registering perforations for the reception of a transverse pin 6, which retains the base and the back in their proper position relative to each other and which also forms a support for the spring-coils 7 of a spring 8.

The spring 8, which is adapted to strike an animal and kill the same when the trap is sprung, consists of a substantially U-shaped loop and the spring-coils 7, the terminals of the latter being arranged against the frame, as clearly shown in Fig. 2 of the accompanying drawings.

The front edge of the base is folded on itself at 9 to form a stiffening-bead, and the spring is maintained in a substantially vertical position for setting the trap by a trigger 10, provided at its upper end with an eye 11, linked into a perforation 12 of the back of the trap. The perforation 12 is located adjacent to the upper edge of the back, and the lower end of the trigger engages a flange 13 of a treadle 14, which is adapted to receive a bait and to be depressed by an animal attracted by the bait, whereby the trap is sprung and the spring is caused to strike the animal. The treadle is provided at its inner or rear end with an L-shaped portion 15 and is secured at its rear edge to a transverse pintle 16, having its terminals arranged in perforations of the flanges 5 of the back 3. The flange 13 is formed integral with the treadle, being struck up from the same. The treadle is constructed of sheet metal and is slit at the angle of the L-shaped portion to form the flange 13.

The base of the trap is provided beneath the treadle with an opening 17 to receive the finger of the operator in order that the trap may be set without liability of striking him, and the treadle is provided with perforations 18 to assist in attaching the bait to it.

The invention has the following advantages: The trap, which is simple and comparatively inexpensive in construction, is positive and reliable in operation, and it is exceedingly sensitive, as only a very slight pressure has to be exerted on the bait-treadle to disengage the flange from the lower end of the trigger.

Changes in the form, proportion, and minor details of construction may be resorted to without departing from the spirit or sacrificing any of the advantages of this invention.

What I claim is—

1. As an article of manufacture, an animal-trap consisting of sheet metal bent to form a base and upright portion, said parts having flanges, which overlap at the adjacent edges, a pin passing through said adjacent ends of the flanges, whereby the base and upright portion are retained rigidly apart, a pivoted treadle, and a spring-jaw, substantially as described.

2. A trap comprising a frame constructed of a single piece of sheet metal bent at an angle to form a base and back, and provided at the side edges of the same with flanges overlapped at their adjacent ends, a pin passing through the overlapped portions of the flanges, a striking-spring having a loop and provided with coils arranged on the pin, a trigger hinged to the back at the top thereof and adapted to hold the spring when the trap is set, and a treadle provided at its back with a pintle fitting in perforations of the flanges of the frame, said treadle being adapted to engage the trigger and provided with a substantially L-shaped rear portion extending over the spring-coils, substantially as described.

3. A trap comprising a frame composed of a substantially vertical back, and a horizontal base having a finger-opening, a spring having coils arranged in the angle of the frame of the trap, a treadle provided with an L-shaped rear portion extending over the spring-coils and hinged to the frame, said treadle being provided with an integral flange located at the angle of the L-shaped portion and cut from the same and bent upward, and a trigger mounted on the back of the frame and arranged to engage the said flange, substantially as described.

In testimony that I claim the foregoing as my own I have hereto affixed my signature in the presence of two witnesses.

CHARLES A. WEVER.

Witnesses:
H. H. PUGH,
GEO. P. JAY.